Oct. 9, 1962  P. G. BERGMAN  3,057,112
BALANCING MECHANISMS FOR DRAWING-TABLES
Filed Oct. 5, 1959  3 Sheets-Sheet 1
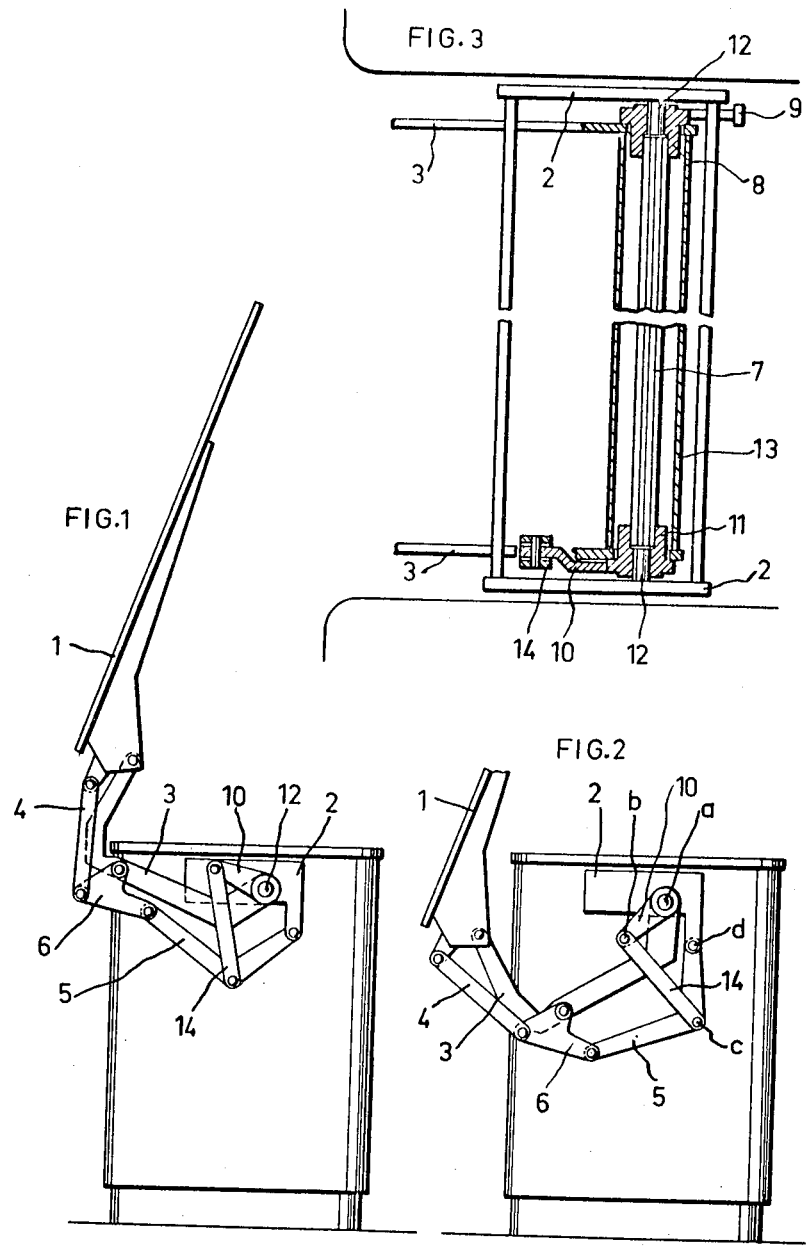
INVENTOR.
Per Goethold Bergman
BY
Karen W. Flocks

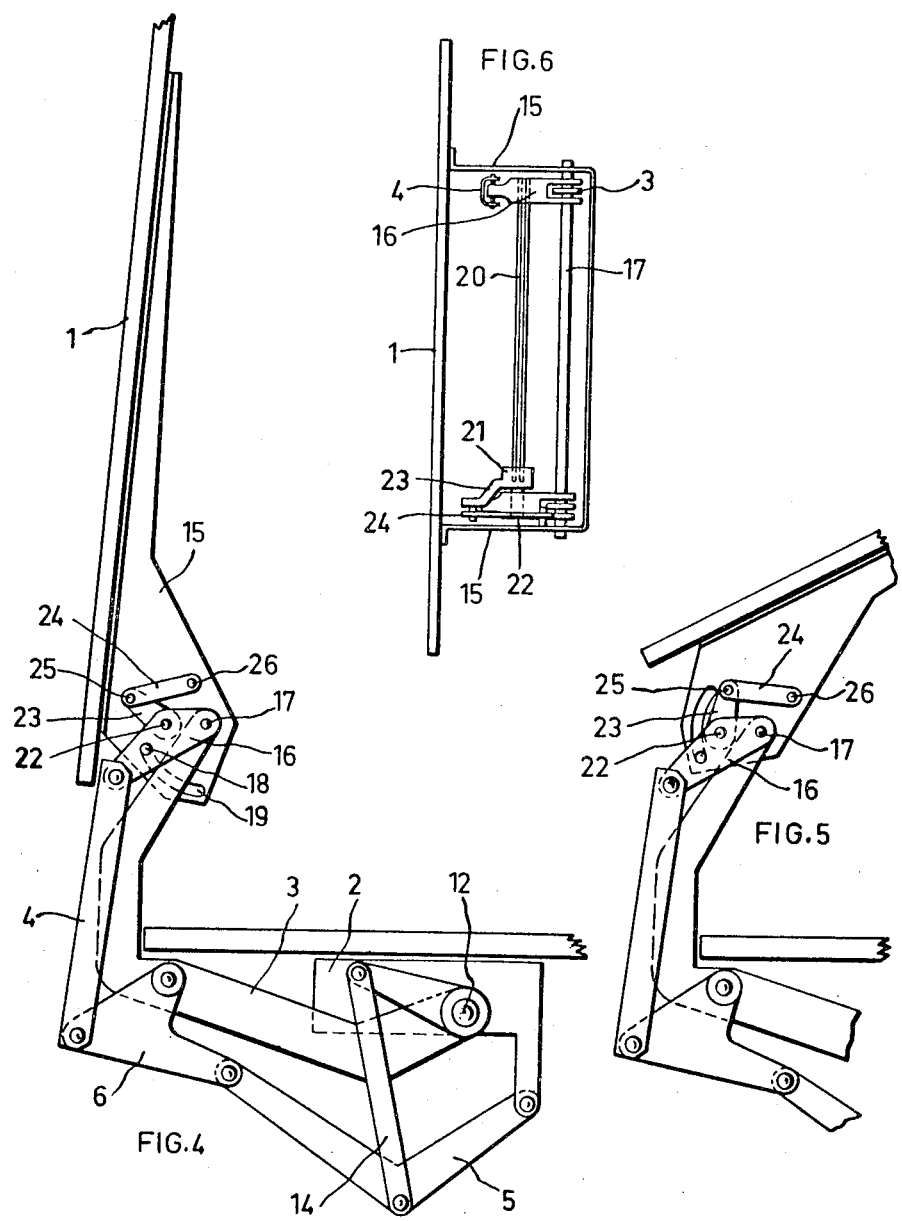

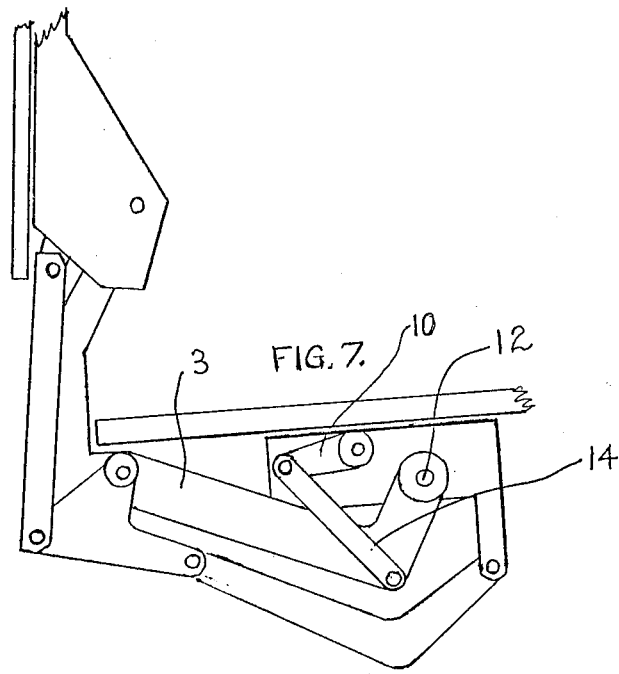

United States Patent Office 3,057,112
Patented Oct. 9, 1962

3,057,112
BALANCING MECHANISMS FOR DRAWING-TABLES
Per Gotthold Bergman, Hyggevagen 21, Spanga, Sweden
Filed Oct. 5, 1959, Ser. No. 844,277
5 Claims. (Cl. 45—131)

This invention relates to a mechanism in drawing-tables for balancing the drawing-board at the vertical adjustment thereof or at the pivotment thereof to different positions of inclination in such drawing-tables where said movement of the drawing-board is brought about over brackets, supporting arms or the like which are mounted for pivotment about a fulcrum, said balancing mechanism comprising at least one torsion spring which is composed of one or more spring elements.

The torque of the drawing-board about the fulcrum in drawing-tables of the kind referred to above follows a sine curve at the vertical adjustment of the drawing-board. As the curve of the torsion spring torque in relation to the angular distortion is a straight line, it is not possible therefore, without obtaining considerable balancing faults, to provide a torsion spring which is directly connected to the arms and frame of the drawing-board. For a fully satisfactory balancing the torsion spring thus must be equipped with a compensation device. The same applies to the pivotment of the drawing-board to different positions of inclination. According to the invention, the torsion spring consequently is connected to at least one lever which is connected by a rigid coupling member, preferably a link, to one of the supporting arms, brackets or the like or to a rod or the like for the parallel motion of the drawing-board at the vertical adjustment thereof.

Further features of the invention and the advantages gained thereby will become apparent from the following description, reference being had to the accompanying drawings which by way of example show the balancing mechanism in two embodiments as applied to drawing-tables. FIGS. 1–3 show the first embodiment of the balancing mechanism in connection with the vertical adjustment of the drawing-board, while FIGS. 4–6 show the second embodiment of the balancing mechanism in connection with the pivotment of the drawing-board to different positions of inclination.

In the drawings:
FIGS. 1 and 2 are side elevational views of the drawing-table, the drawing-board occupying its uppermost position in FIG. 1 and its lowermost position in FIG. 2;
FIG. 3 is a plan view of the drawing-table, the supporting shaft of the drawing-board being shown in section;
FIGS. 4 and 5 are side elevational views of the drawing-table, the drawing-board occupying an almost vertical position in FIG. 4 and a more inclined position in FIG. 5;
FIG. 6 is a plan view of the drawing-board; and
FIG. 7 is a side elevational view of another embodiment of the present invention showing a modification of the mechanism of FIG. 1.

The drawing-board is pivotally carried in two supporting arms 3 which are mounted for pivotment in a frame 2. At its vertical adjustment the drawing-board 1 is held in a constant inclination by parallel motion rods 4 and 5 and an angle plate 6.

In the embodiment shown in FIGS. 1–3 a torsion spring 7 composed of several spring elements is adjustably secured to the frame 2 on one side thereof by means of a rotary holder 8 and a setscrew 9. Fixedly attached to the torsion spring 7 on the other side of the frame 2 is a lever 10 which is provided with a sleeve 11 arranged at right angles thereto and engaging the torsion spring 7. The holder 8 and the sleeve 11 are mounted on stub shafts 12 secured in the frame 2. The supporting arms 3 are mounted on the holder 8 and sleeve 11 and interconnected by a tube 13.

Attached to the end of the lever 10 remote from the torsion spring 7 is a link 14 which has its other end connected to the parallel motion rod 5. The sides and angles of the quadrilateral defined by points a, b, c, and d in FIG. 2 are so chosen that the torsion spring torque is compensated for, whereby said torque in any height position of the drawing-board 1 will at least approximately correspond to that of the drawing-board 1 about the stub shafts 12.

As appears from FIG. 3, the mounting point of the lever 10 on the stub shaft 12, the mounting point of the supporting arm 3 on the sleeve 11 of the lever 10, and the mounting point of the link 14 in the lever 10 lie substantially on a straight line so that no oblique forces will arise in said points.

The torsion spring 7 may also be disposed adjacent the supporting shaft 12. Furthermore, it may be disposed in or adjacent any of the remaining fulcra included in the parallelogram system which at the vertical adjustment of the drawing-board maintains the inclination thereof constant. In such a case the link 14 extending from the lever 10 may be connected to the supporting arm 3 as shown in FIG. 7.

It is possible to secure the torsion spring in the frame also at a point other than at one end of the spring, say the middle, and the compensation device may also be located at a point other than at the other end of the spring 7.

In another embodiment of the invention the drawing-table may be provided with several torsion spring sets all or some of which are equipped with compensation devices.

In the embodiment shown in FIGS. 4–6 the drawing-board 1 is provided at its rear with brackets 15 to which the supporting arms 3 and parallel motion rods 4 are connected via parallel motion members 16. At the fulcra between the supporting arms 3 and the members 16 the drawing-board 1 is provided with a shaft 17 about which the board can be swung to different positions of inclination. Locking means 18 permit the drawing-board 1 to be fixed to the members 16 in different positions of inclination. At a change in the inclination of the drawing-board 1 the locking means 18 run in slots 19 in the brackets 15.

The balancing mechanism for pivoting the drawing-board 1 into different positions of inclination about the shaft 17 comprises a torsion spring 20 which is composed of one or more spring elements. This spring 20 has one end attached to one parallel motion member 16 and the other end secured in a sleeve 21 which has a stub shaft 22 mounted in the other parallel motion member 16. The sleeve 21 is also provided with a lever 23 fixedly secured thereto, a link 24 being pivoted to the end of the lever 23 remote from the torsion spring 20. Said link 24 has its end remote from the lever 23 pivotally mounted on the corresponding bracket 15. The fulcrum between lever 23 and link 24 is designated 25 while the fulcrum between link 24 and bracket 15 is designated 26.

The sides and angles of the quadrilateral defined by points 17, 22, 25 and 26 are so chosen that the torsion spring torque is compensated for, whereby said torque in any position of inclination of the drawing-board 1 will at least approximately correspond to that of the drawing-board 1 about the shaft 17.

While some preferred embodiments of the invention have been described in the foregoing, it is understood that the invention is not limited to these very embodiments but permits of modification within the scope of the appendant claims.

What I claim and desire to secure by Letters Patent is:

1. In a balancing mechanism for an adjustable drawing-table including a table top mounted on a plurality of sectional supporting arms having sections linked pivotally in end-to-end relation for movement about a horizontal fulcrum, and a torsion spring connected to the supporting arms at the fulcrum for counterbalancing the weight of the table top, the improvement comprising a lever having one end mounted pivotally at the fulcrum and secured to the torsion spring, and a rigid link pivotally connecting the opposite end of the lever within an intermediate section of said pivotally linked supporting arms, said lever, said link and said section of the supporting arms together defining a linkage mechanism which provides compensation for variations between the torque curves of the torsion spring and of the table top.

2. In a balancing mechanism for an adjustable drawing-table including a table top mounted on a pair of sectional supporting arms having sections linked pivotally in end-to-end relation for movement about a horizontal fulcrum during vertical adjustment of the table top, and a torsion spring connected to the supporting arms at the fulcrum for counterbalancing the weight of the table top, the improvement comprising a lever having one end mounted pivotally at the fulcrum and secured to the torsion spring, and a rigid link having one end thereof pivotally connected to the opposite end of the lever and having the opposite end of the link connected pivotally to one of the supporting arms at the end-to-end connection of adjacent intermediate sections thereof, said lever, said link and said intermediate sections of said supporting arm together defining a quadrilateral linkage mechanism which provides compensation for variations between the torque curves of the torsion spring and of the table top during vertical adjustment of the table top.

3. In a balancing mechanism for an adjustable drawing table having a table top mounted upon supporting arms movable pivotally about a horizontal fulcrum, and a torsion spring joined to the supporting arms for counterbalancing the weight of the table top, the improvement comprising a lever having one end secured to the torsion spring, and a rigid link having one of its ends pivotally connected to the opposite end of said lever and having the opposite end of the link pivotally connected to an intermediate section of the supporting arms, whereby said lever, said link and said section of the supporting arms cooperate in defining a linkage mechanism which provides compensation for variations between characteristic torque curves of the torsion spring and of the table top.

4. In a balancing mechanism for an adjustable drawing table including a table top mounted upon a pair of parallel sectional supporting arms having sections thereof linked together pivotally in end-to-end relation for pivotal movement about a horizontal fulcrum, and including a torsion spring joined to the supporting arms for counterbalancing the weight of the table top, the improvement comprising a lever having one end secured to the torsion spring, and a rigid link having one of its ends pivotally connected to the opposite end of said lever and having the opposite end of the link pivotally connected to an intermediate section of the supporting arms at the point of one of the end-to-end linkages of adjacent sections thereof, whereby said lever, said link and said sections of the supporting arms cooperate in defining a quadrilateral linkage mechanism which provides compensation for variations between the normally sinusoidal torque curve of the table top and the characteristic straight line torque curve of the torsion spring.

5. A balancing mechanism for an adjustable drawing table comprising supporting arms movable pivotally about a horizontal fulcrum, a table top mounted upon said supporting arms, a torsion spring joined to said supporting arms for counterbalancing the weight of said table top, a lever having one end secured to said torsion spring, a rigid link having one of its ends pivotally connected to the opposite end of said lever and having the opposite end of said link pivotally connected to a supporting arm, means for securing said lever to said torsion spring including a sleeve on said lever at a right angle to said lever and engaging said torsion spring, and a supporting stub shaft for mounting said sleeve, said sleeve forming a fulcrum for one of said supporting arms.

References Cited in the file of this patent

UNITED STATES PATENTS

| | | |
|---|---|---|
| 522,598 | Jones | July 10, 1894 |
| 1,845,868 | Eriksen | Feb. 16, 1932 |
| 2,539,700 | Pieper | Jan. 30, 1951 |
| 2,797,434 | Vigmostad | July 2, 1957 |